(12) United States Patent
Pennello et al.

(10) Patent No.: US 7,133,820 B2
(45) Date of Patent: Nov. 7, 2006

(54) METHOD AND APPARATUS FOR DEBUGGING PROGRAMS IN A DISTRIBUTED ENVIRONMENT

(75) Inventors: Thomas J. Pennello, Santa Cruz, CA (US); Henry A. Davis, Santa Cruz, CA (US)

(73) Assignee: ARC International, Herts (GB)

( * ) Notice: Subject to any disclaimer, the term of this patent is extended or adjusted under 35 U.S.C. 154(b) by 745 days.

(21) Appl. No.: 09/808,612

(22) Filed: Mar. 14, 2001

(65) Prior Publication Data

US 2001/0056341 A1 Dec. 27, 2001

Related U.S. Application Data

(60) Provisional application No. 60/189,521, filed on Mar. 15, 2000.

(51) Int. Cl.
*G06F 13/10* (2006.01)
*G06F 9/44* (2006.01)

(52) U.S. Cl. .............. 703/22; 703/21; 717/4; 717/109; 717/124; 717/125; 717/102; 717/127; 717/135

(58) Field of Classification Search ............ 703/20, 703/13, 23, 22; 716/16; 717/124, 4, 102–135
See application file for complete search history.

(56) References Cited

U.S. PATENT DOCUMENTS

| 4,051,352 | A | * | 9/1977 | Eichelberger et al. ...... 708/230 |
| 4,674,089 | A | | 6/1987 | Poret et al. |
| 5,101,491 | A | * | 3/1992 | Katzeff .................. 703/22 |
| 5,133,057 | A | | 7/1992 | Ishii et al. |
| 5,175,856 | A | | 12/1992 | Dyke et al. |
| 5,179,702 | A | | 1/1993 | Spix et al. |
| 5,193,187 | A | | 3/1993 | Strout et al. |
| 5,274,797 | A | | 12/1993 | Barlow et al. |
| 5,371,746 | A | * | 12/1994 | Yamashita et al. ............ 714/38 |
| 5,410,685 | A | | 4/1995 | Banda et al. |
| 5,452,437 | A | | 9/1995 | Richey et al. |
| 5,495,615 | A | | 2/1996 | Nizar et al. |
| 5,642,478 | A | * | 6/1997 | Chen et al. .................. 714/45 |
| 5,778,230 | A | | 7/1998 | Wimble et al. |
| 5,787,245 | A | | 7/1998 | You et al. |
| 5,815,653 | A | | 9/1998 | You et al. |
| 5,819,093 | A | | 10/1998 | Davidson et al. |
| 5,828,863 | A | | 10/1998 | Barrett et al. |
| 5,892,941 | A | * | 4/1999 | Khan et al. .................. 703/22 |
| 5,980,096 | A | * | 11/1999 | Thalhammer-Reyero .... 707/100 |
| 6,061,517 | A | | 5/2000 | House et al. |
| 6,061,709 | A | * | 5/2000 | Bronte ...................... 718/103 |
| 6,083,281 | A | | 7/2000 | Diec et al. |
| 6,117,181 | A | * | 9/2000 | Dearth et al. ................ 703/22 |
| 6,145,099 | A | | 11/2000 | Shindou |
| 6,158,045 | A | * | 12/2000 | You .......................... 717/124 |
| 6,195,676 | B1 | | 2/2001 | Spix et al. |
| 6,230,307 | B1 | * | 5/2001 | Davis et al. .................. 716/16 |

(Continued)

OTHER PUBLICATIONS

"Debugging of Concurrent Processes", S. Grabner et al, IEEE 1066-6192/95, IEEE 1995.*

(Continued)

*Primary Examiner*—Fred Ferris
(74) *Attorney, Agent, or Firm*—Gazdzinski & Associates

(57) ABSTRACT

A method and apparatus for debugging programs in a distributed environment, such as a set of heterogeneous hardware processors (integrated circuits or In-Circuit Emulators), and/or software-based simulators. In one embodiment, the method comprises identifying a plurality of processes; initializing each of the processes; executing with a single thread of control among the processes; and continuously cycling among the processes to obtain status information. A computer program and apparatus for implementing the aforementioned methodology are also disclosed.

28 Claims, 6 Drawing Sheets

U.S. PATENT DOCUMENTS

| | | | | |
|---|---|---|---|---|
| 6,282,701 B1* | 8/2001 | Wygodny et al. | ........... | 717/125 |
| 6,282,702 B1* | 8/2001 | Ungar | ........................ | 717/148 |
| 6,516,460 B1* | 2/2003 | Merks et al. | ................ | 717/124 |
| 6,567,837 B1* | 5/2003 | Robinson | ........................ | 718/1 |
| 6,718,294 B1* | 4/2004 | Bortfeld | ........................ | 703/20 |
| 2001/0056571 A1* | 12/2001 | Pennello et al. | ................ | 717/4 |
| 2002/0174415 A1* | 11/2002 | Hines | ........................ | 717/127 |

OTHER PUBLICATIONS

"A Concurrent Program Debugging Environment using Real-time Replay", E.H. Piak et al., IEEE 0-8186-8227-2/97, IEEE 1997.*

"Fast Development of source-Level Debugging Using Hardware Emulation", S. Nam et al, IEEE ISBN 0-7803-5974-7, IEEE 2000.*

"Introduction to Computer Architecture", Stone, pp. 182-183, SRA Associates, INC, 1980.*

Anonymous, "Enea OSE System and Green Hills Software Team to Make Run-Mode Debugging a Reality," Green Hills Software, Inc., Aug. 5, 1999, XP002180477 News and Press.

Anonymous, "A Java-Based Debug Model," Research Disclosure, vol. 41, No. 415, Nov. 1, 1998, XP-002180478, Havant, UK, Article No. 41577.

* cited by examiner

METHOD AND APPARATUS FOR DEBUGGING PROGRAMS IN A DISTRIBUTED ENVIRONMENT

PRIORITY

This application claims priority to U.S. provisional patent application Ser. No. 60/189,521 filed Mar. 15, 2000 and entitled "Method and Apparatus for Debugging Heterogeneous Processors."

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the field of debugging programs in a distributed environment, such as a set of heterogeneous hardware processors (integrated circuits or In-Circuit Emulators), and/or software-based simulators.

2. Description of Related Technology

The process of debugging software intended for operation in embedded applications is a task that employs many different tools depending on the stage of software readiness. Programs are often organized in a hierarchical fashion, but need not include such structure. While structured programs are easier to debug because there is a reduced span of control within the software, both structured and unstructured programs commonly employ similar programming techniques including functions, subroutines, co-routines, and the like. Software-based simulators are used to provide design engineers and programmers (hereinafter "engineers") with absolute control over the execution of the software to be debugged. This process permits control at varying degrees of granularity ranging from a single line of code to larger blocks such as procedures, functions, and subroutines. Control includes among other facilities, the ability to start and stop execution, report results and change memory contents.

Multiprocessor systems complicate the debugging process significantly as compared to a unitary processor hardware environment. The most complex debugging environment is one in which the processors used in the multi-processor hardware employ different instructions sets. This condition is known to those skilled in the art as a heterogeneous multiprocessor system.

Heretofore, engineers have relied on diverse development environments, often provided by many different vendors, to debug such heterogeneous systems. These diverse development environments often provide different user interfaces, different commands, different capabilities, and sometimes employ different underlying computer operating systems which makes information transference between the systems challenging at best.

These conditions force engineers involved with debug to be less productive than would otherwise be possible were the interfaces common between all of the different processors. Further, each different system requires engineers to become conversant with its unique capabilities and disabilities, which requires more learning time and results in reduced productivity.

Additionally, the use of such heterogeneous development environments potentially introduces more error, due largely to the fact that the development environment associated with one of the heterogeneous processors utilizes one function for a given keystroke or other user input, while a different environment may utilize an all together different function for that same keystroke or input. Accordingly, the engineer must in effect maintain a "correlation table" for the various functions and associated inputs depending on which development environment is being used.

Based on the foregoing, what is needed is an improved method and apparatus for debugging devices such as heterogeneous processors. Such method and apparatus would ideally be readily adaptable to a number of different hardware/software environments, would allow for ready transfer of information associated with one processor to the development/debug environment of another, thereby facilitating side-by-side comparison of the operation of the different processors. Such improved debug method and apparatus would also be readily adapted to run on conventional microprocessor-based platforms, and accommodate inputs from both the aforementioned hardware processes and simulation processes.

SUMMARY OF THE INVENTION

The present invention satisfies the aforementioned needs by an improved method and apparatus for debugging devices such as heterogeneous processors.

In a first aspect of the invention, an improved method for debugging programs in a distributed environment is disclosed. In one exemplary embodiment the environment comprises heterogeneous hardware digital processors (integrated circuits or In-Circuit Emulators), and/or software-based simulators, and the method comprises: identifying a plurality of processes; initializing each of the processes; executing with a single thread of control among the processes; and continuously cycling among the processes to obtain status information. Each "running" simulation process simulates the execution of a single instruction for each status request. In a second exemplary embodiment, the method further comprises initializing profile information, and incrementing the profile history after simulation (simulator) or execution (hardware) of one instruction.

In a second aspect of the invention, an improved computer program useful for debugging such distributed programs is disclosed. In one exemplary embodiment, the computer program comprises a $C^{++}$ source code listing reduced to an object code representation and stored on the magnetic storage device readable by a microcomputer, and adapted to run on the central processing unit thereof. The computer program further comprises an interactive, menu-driven graphical user interface (GUI), thereby facilitating ease of use. The basic design of the computer program takes an object-oriented approach, with an abstract class defined to provide the interface to an individual process within the target system.

In a third aspect of the invention, an improved debug architecture is disclosed. In one exemplary embodiment, the improved debug architecture comprises a digital processor with a debug process running thereon, at least one simulation process associated and in data communication therewith, and at least one hardware process in data communication with the processor, wherein the simulation and hardware processes are executed with a single thread of control via the debug process.

In a fourth aspect of the invention, an improved apparatus for running the aforementioned debug computer program is disclosed. In one exemplary embodiment, the system comprises a stand-alone microcomputer system (e.g., IBM PC) having a display, central processing unit, data storage device(s), and input device. The apparatus is adapted to run one or more of the aforementioned simulators and the debug program, and interface with one or more hardware processes external to the apparatus via respective data interfaces. The engineer may then debug the multiple hardware processes using the debug program and simulation process(es), advantageously avoiding the need for multiple hardware/software environments for the debug and simulation processes.

DETAILED DESCRIPTION

Figure 1:
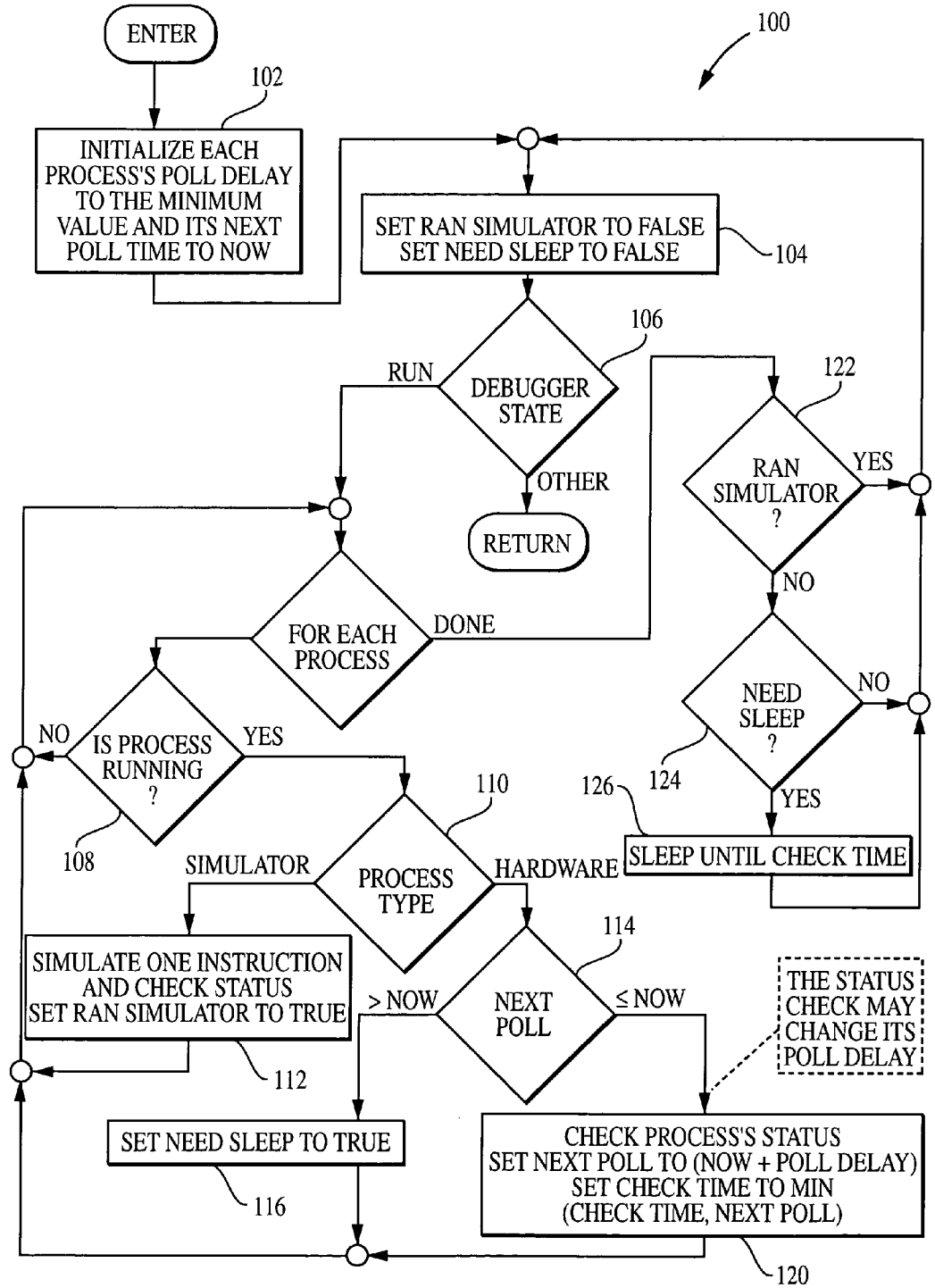
FIG. 1 is a logical flow diagram illustrating one exemplary embodiment of the general debugging methodology employed by the present invention.

Reference is now made to the drawings wherein like numerals refer to like parts throughout.

As used herein, the term "processor" is meant to include any integrated circuit or other electronic device capable of performing an operation on at least one instruction word including, without limitation, reduced instruction set core (RISC) processors such as the ARC™ user-configurable core manufactured by the Assignee hereof, central processing units (CPUs), and digital signal processors (DSPs). The hardware of such devices may be integrated onto a single piece of silicon ("die"), or distributed among two or more dies. Furthermore, various functional aspects of the processor may be implemented solely as software or firmware associated with the processor.

As used herein, the term "process" refers to executable software that runs within a processor environment. This means that the process is typically scheduled to run based on a time schedule or system event. It will generally have its own Process Control Block (PCB) that describes it. The PCB may include items such as the call stack location, code location, scheduling priority, etc. The terms "task" and "process" are often interchangeable with regard to computer programs.

Similarly, a "task" as used herein generally refers to a process-like entity whose PCB is referred to as a Task Control Block (TCB). A "thread" refers to a process having the same properties as a task except that it runs within a task context and uses the task's TCB. Multiple threads can run within the context of a single task. Threads are often more efficient than tasks because they don't require as much time to be switched into CPU context when the task they are associated with is already running.

Overview

In general, the present invention provides a flexible system for debugging programs in a distributed environment. In one embodiment, such a distributed environment comprises a set of heterogeneous hardware processors (integrated circuits or In-Circuit Emulators), and/or software-based simulators; see the discussion with respect to FIG. 3 below.

The basic design takes an object-oriented approach with an abstract class defined to provide the basic interface to an individual process within the target system. Among other benefits, the use of an object-oriented approach allows language-independence at the design level. Object-oriented programming is well understood in the computer programming arts, and accordingly will not be described further herein.

The methods and instance variables of this abstract class fall into two categories: (i) those relating to direct control of the target processor and examination of its state; and (ii) those relating to synchronization and control of the individual processes by the debugging system.

Instance variables relating to direct control of the target processor include, inter alia, setting and examining register values and the contents of memory; starting, stopping, and "single-stepping" the processor; setting hardware-controlled breakpoints; and similar operations. Registers are often employed by engineers (or the output of compilers) to hold working variables; i.e., those that are being operated upon. These registers frequently contain values of substantial interest to the design engineer/programmer. Consequently, it is important for the debug environment to provide access to such register values. Many programming errors may be temporarily corrected by a skilled engineer through affording the ability to modify the contents of these registers. Such is often the case with programmatic loop constructs that either terminate prematurely or fail to terminate at the intended time. By modifying a register value, the engineer performing the debugging task may be able to permit the program to proceed further in the program sequence while producing correct results. This ability significantly reduces development time by permitting the engineer to make changes that are local in scope, yet have a global impact on the functioning of the software.

So-called "single stepping" of a processor, whether as a simulation process or a hardware process, permits engineers to follow the execution of the software to determine where implementation or design errors exist. Generally accepted debugging practice is defined, inter alia, in IEEE 1008-1987 IEEE Standard for Software Unit Testing and terms in IEEE Std 610.12-1990, Standard Glossary of Software Engineering Terminology (ANSI).

Synchronization and control variables include, inter alia, time of last status check; the current delay between status checks; whether the process is running in a simulator or in hardware; the processor type and options; and similar parameters.

In the present embodiment of the invention, individual subclasses are defined for each supported processor, In-Circuit Emulator (ICE), or simulator with each subclass being implemented generally as a dynamically loadable library. By creating individual subclasses for each processor, it is possible to dynamically link processors into the system without the need to recompile or otherwise reconfigure the static structure of the debug environment. The use of a dynamically loadable library permits changes to be made while the debugger is in operation without necessarily halting the execution of other processors. Further, this permits the engineer performing debug activities to simulate the failure of one or more procesors by selectively switching them out of the debug environment. In addition, it is possible to substitute the operation of actual hardware in place of a simulator or in-circuit emulator to permit continuous debugging as more information is gathered.

Some digital processor families reserve a section of the processor instruction set for so-called "extended operations" or "extensions" which are typically implemented in customized sections of the hardware to perform application-specific functions such as Viterbi decode, FFT, and the like. To handle these extended operations in the debugger, the processor instance class for those processor types defines a further interface to dynamically loadable libraries which embody one or more of the possible extended operations. When the instance is an interface to a hardware processor, the libraries provide the functions for displaying the extension instruction in machine code listings.

When the instance is a software simulator, the extension library must also provide the implementation of the instruction itself. It will be appreciated that software simulators operate by implementing the logical operation of hardware in software. Hardware functions are performed by sequences of software instructions in the simulator. State information and registers are assigned specific memory locations in the simulation software memory space. Within the ARC design environment, the hardware extension library contains the HDL model for the hardware used during the compilation phase. Since the extension may also be implemented during the debug phase by a software simulator, it is necessary to also provide this software in the extension library.

When debugging, each process will normally be in one of two states. It may be stopped, with execution suspended while the user examines and possibly modifies the process state before continuing. Alternatively, the process may be running, in which case it executes instructions until it reaches a breakpoint, error condition, a certain amount of time has passed, or the user manually requests the operation be suspended. It will be recognized that the foregoing list of conditions under which a running process is terminated is not all inclusive; other situations where the process terminates may exist.

When running, it is desirable for the process to execute, as nearly as possible, at the speed with which execution would occur if it were not running under the control of a debugger. In this way, the actual operation of the process on the device is most closely simulated. However, it is also desirable to rapidly and continuously update the status displays for the user. In practice, obtaining status information from hardware processors often takes a large amount of time as compared to the execution of a single instruction; so the use of continuous status requests would significantly impair performance. Conversely, when running in a simulator, obtaining the status has relatively little impact; some care must be taken, however, to keep multiple simulations synchronized as though they were running on parallel hardware processors. Furthermore, it is desirable that the debugger itself run as efficiently as possible to reduce the impact on any other programs which may be concurrently executing.

To address the foregoing issues, the debugger of the present invention executes with a single thread of control which, when in "run" mode, continuously cycles among the various processes obtaining status information. Each "running" simulation process will simulate the execution of a single instruction for each status request. Associated with each running hardware process is an indication of when the status was last checked, and a variable delay interval indicating when it should next be checked. This association occurs as a consequence of employing an object oriented language such as C++, but may also be implemented by use of explicit parameters passed via function or subrountine calls. Alternatively, the association may be made completely explicit by use of a common data structure such as mailboxes, message buffers and similar communications protocols commonly used by operating systems to manage such data. In the instance where all such running processes are executing on hardware processors, then each iteration through the status loop further includes an idle period designed to delay the debugger until at least one process is ready to be checked.

Methodology

Referring now to FIG. 1, the generalized method of debugging distributed programs according to the present invention is described. The exemplary embodiment of FIG. 1 is described in terms of a computer program, although it will be recognized that such program is only one means for implementing the method of the invention. For example, certain portions of the functionality described herein could be implemented in hardware if desired.

As illustrated in FIG. 1, the method 100 generally comprises the steps necessary to repeatedly obtain the status of each running processor in sequence, subject to the aforementioned conditions. If any of the running processors are being simulated, the simulation of the illustrated embodiment will be advanced by one instruction before its status is checked. To allow processes running on hardware to run as efficiently as possible, they will only be checked when a specified per-process time interval has elapsed since the previous check. This time interval may be varied (either statically, such as by merely changing the duration of the interval, or dynamically, such as based on the output of an associated algorithm which calculates a time interval based on other parameters), and is set according to the attributes of the paticular process and hardware. At the end of each check cycle, if it is determined that all running processes are executing on hardware, and none of the running processes are ready to be checked, a predetermined delay may be invoked to prevent unnecessary passes through the check loop. Similar to the per-process interval period, the predetermined delay may be varied (statically or dynamically) as well.

In step 102, the poll delay associated with each process is initialized. As used herein, the term "poll delay" refers to the minimum time period between retrievals of processor status information for display to the user. In the present embodiment, the poll delay is initialized to the minimum value, and its next poll time set to "now". As used herein, the term "now" is used to indicate the current point in time at which "now" is referenced. Next, in step 104, the "ran simulator" value is set to "false", and the "need sleep" value also set "false". The "ran simulator" and "need sleep" values determine the desirability of introducing a delay before the next cycle of processor status checks.

In step 104, the debugger state is determined; if in "run", the program proceeds to step 106, where for each process, the run status of that process is determined (step 108). If the debugger is in a state other than run (e.g., stop), then the process returns as shown in FIG. 1. For each process, if the process is running, the process type is next determined in step 110. The term "process type" as used herein refers to whether the processor is running in the simulation or hardware environment.

If the process type is the simulation environment, the program proceeds to step 112, where the simulated processor is advanced through one instruction cycle. The simulated processor's status is subsequently checked. The "ran simulator" value is then set to "true", and the program returns to step 108 again for the next process.

In the hardware environment (step 110), the value of the "next poll" is determined per step 114; if it represents a time in the future relative to the present time, the "need sleep" value is set to "true" per step 116, and the program returns to step 108 again. This in effect delays the program for a predetermined time until the next polling opportunity is available, as previously described. If the value of the next poll is the current time or a time in the past, the polling opportunity is immediately available, and the status of the process is checked per step 120. The value of "next poll" is set to the current time plus the processor's poll delay per step 120 as well. The "check time" value is also set to the minimum of the current "check time" or the "next poll" value in this step 120 as well. Note that the status check of step 120 may change the poll delay value to better balance the need to display processor status with the desire to minimize the use of system resources. This need is determined by monitoring the current systems resource availability and comparing that to the amount that may be required to perform both the display function and other functions that may be operating concurrently. This monitoring is well known to those skilled in the art of operating systems design as part of "load balancing," Proper load balance may be determined by a number of techniques known to those of ordinary skilled in the art of operating systems design, the specific techniques of which are not relevant to the present invention. For example, such techniques are taught in "Operating Systems Principles" by Per Brinch Hansen, Prentice Hall 1973. After these operations have been completed, the program returns to step 108.

After the foregoing steps 110 through 120 have been completed for each process, the program checks the value of the "ran simulator" variable per step 122 to determine whether any of the running processes are executing in simulators. If so, the program advantageously returns immediately to step 104 so that the simulation(s) will run as quickly as possible, as is desired in order to most closely replicate the actual operating conditions of the simulated device. If no running processes are executing in simulators, then the program proceeds to step 124 to determine if any of the hardware processes were not yet ready to be checked, as indicated by the "need sleep" value set to "true". If all hardware processes have been checked, the program returns to step 104. If at least one hardware process was not ready to be checked, the program sleeps until the next "check time" per step 126. At the next check time, the program awakes and returns to step 104.

Figure 1A:
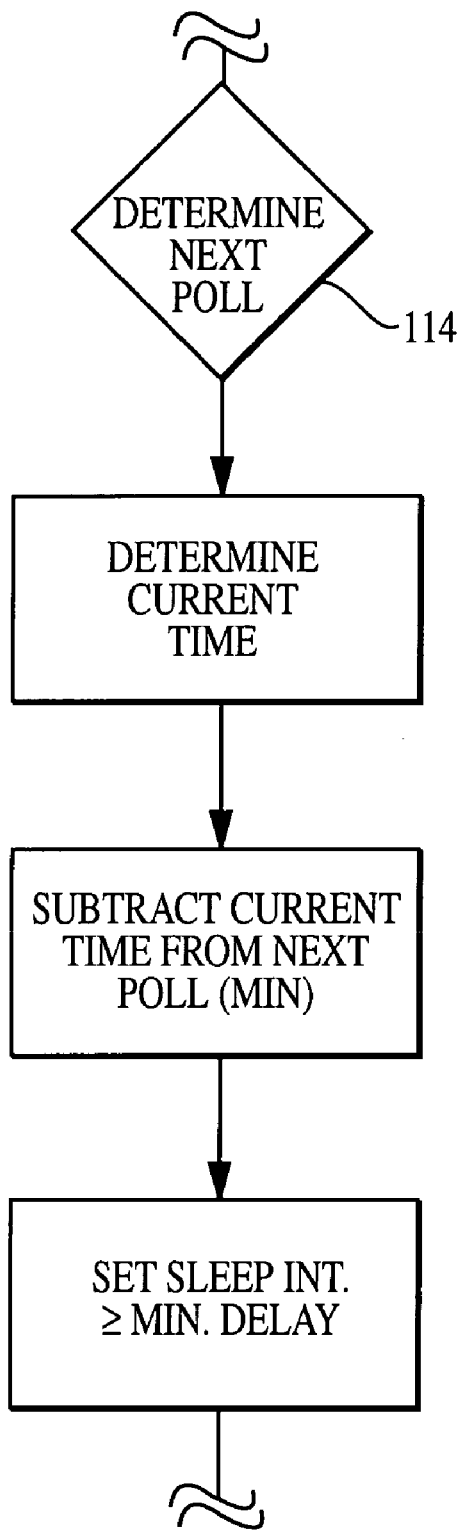
FIG. 1a is logical flow diagram illustrating an alternate embodiment of determining the sleep interval based on poll delay according to the invention.

It will be recognized that while the aforementioned poll delay and "need sleep" intervals are described in terms of predetermined, fixed time periods, these intervals may alternatively be variable in nature, depending on the value of other parameters or the existence of other circumstances within the hardware/simulation environments. For example, in one alternate embodiment, the value associated with the "need sleep" interval is algorithmically determined based on analysis of the value of the "next poll" determination in step 114. Specifically, as illustrated in FIG. 1a, the current time (referenced to the time when step 114 is executed) is subtracted from the value of the "next poll" determined in step 114 to arrive at a minimum delay value before the polling of that device is available. In this fashion, the "need sleep" interval is dynamically adjusted based on the next available polling opportunity, thereby reducing an "extra" delay introduced by a fixed sleep interval.

In another embodiment, the required sleep interval is determined based on statistical analysis of historical data obtained either from past debug operations for the hardware environment under analysis, from operating history generated immediately prior to the poll delay determination in step 114 (such as using a moving "window" technique of the type well known in the art), or some combination thereof. Numerous types of statistical/historical analyses and associated algorithms are known to those of ordinary skill in the programming arts, and accordingly are not described further herein.

Figure 2:
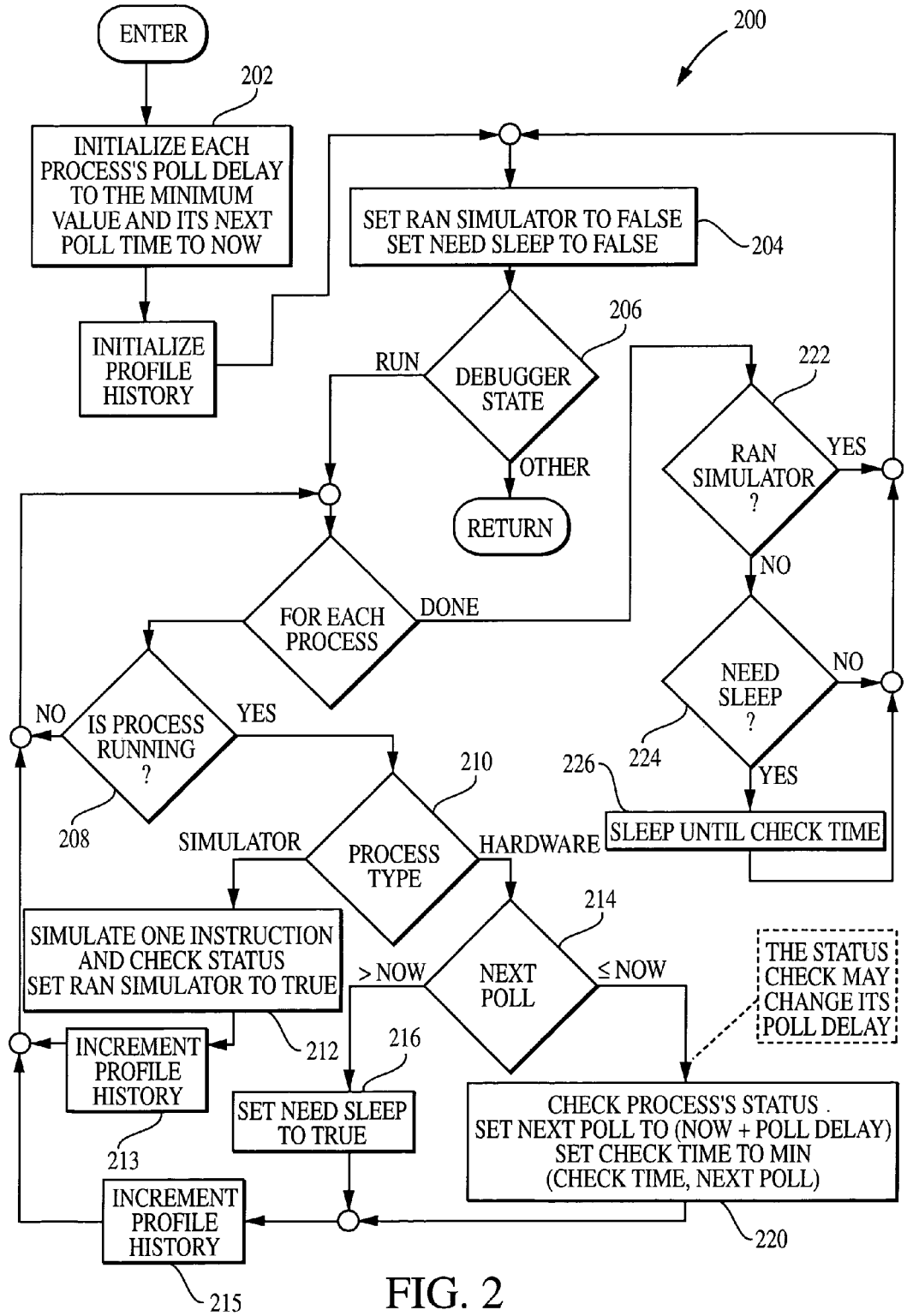
FIG. 2 is a logical flow diagram illustrating a second embodiment of the debugging methodology employed in the present invention, incorporating profile histories.

Referring now to FIG. 2, an alternate embodiment of the method of FIGS. 1–1a is described. Optimizing systems performance in a single processor system is a relatively simple matter of moving applications code to better utilize the CPU, modifying the code to better reflect the systems capabilities, and/or developing a new algorithm for the specific circumstances under which the system is operating. For multiple processor systems, however, this process becomes much more complicated. Each individual processor can be optimized for locally optimum performance but the systems may still have suboptimal performance. The methodology 200 of FIG. 2 advantageously permits engineers to perform both local and global optimizations across multiple processors based on the execution history of the system when data representative of "real world" inputs is supplied. Alternatively, real world data may be supplied to the system for the purpose of collecting execution history profiles. These profiles may identify: (i) individual instructions of a program running on a specific processor; (ii) sequential blocks of code running on a specific processor, and (iii) functions, subroutines or other information determined by the engineer to be valuable during the optimization process. Such information may include, for example, patterns of register references, number of memory references, patterns of memory reference, and the like.

In the modified run loop of FIG. 2, the aforementioned profile history is initialized during the beginning of the run loop (step 203), and profile history collected (steps 213, 215) after both the simulations step and hardware execution step. These two profile history data collection functions simply record execution information specified by the engineer for later presentation. The modified run loop of FIG. 2 operates in the same manner as that of FIGS. 1–1a in all other respects.

Figure 2A:
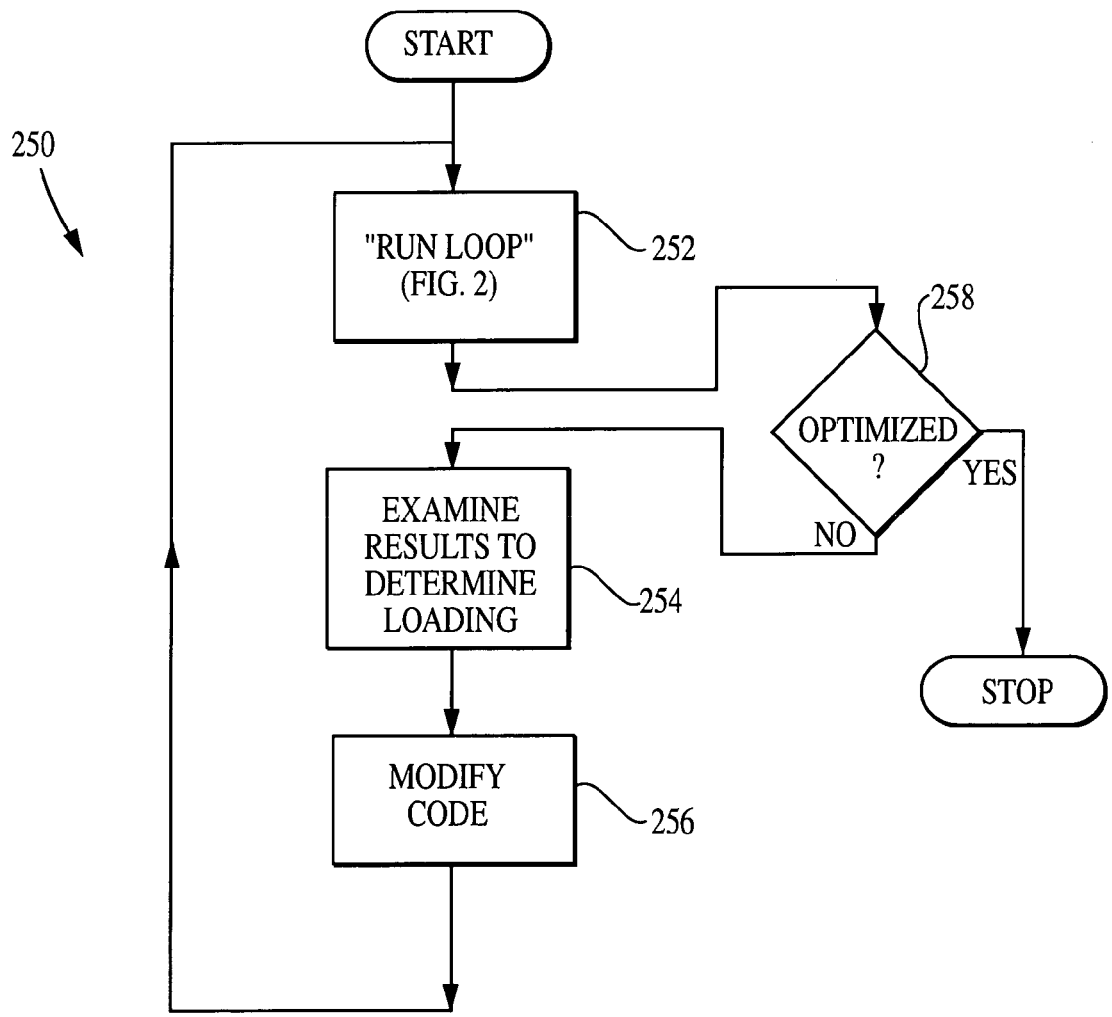
FIG. 2a is a logical flow diagram illustrating the use of the method of FIG. 2 to optimize the systems performance of a multi-processor based system.

Referring now to FIG. 2a, the method 200 of FIG. 2 is employed as a step in the method 250 of optimizing the performance of a mutliprocessor system. The run loop function of FIG. 2 is performed to gather execution history as may be determined by the user's selection of information to be gathered (step 252). These results are then examined (step 254) to determine which if any processors are relatively overloaded, and which if any are relatively underloaded. Portions of executable code may be rearranged within the scope of a single processor's program space, restructured so as to consume fewer resources, or partitioned across processors so as to more economically computer the desired result (step 256). The aforementioned improvements to the performance of the multi-processor based system are well known to one of ordinary skill in the art of programming multi-processor systems and is not further discussed here. Once the improvements are made, the run loop function is again executed (step 258) to gather execution history data that will prove or disprove the performance. The process continues iterating until the performance goals determined by the user have been met, or the user has determined that the goals can not be met.

It will be recognized that while the foregoing example and description with respect to FIGS. 1, 1*a*, 2, and 2*a* herein is cast in terms of a specific series of steps for accomplishing the desired result (i.e., debugging in a distributed environment), various permutations of this series of steps, including substitution and/or addition of other steps, may be used consistent with the invention disclosed herein. Accordingly, the scope of the disclosed invention should be determined by the claims appended hereto, without respect to specific embodiments or limitations presented within the foregoing discussion.

Figure 3:
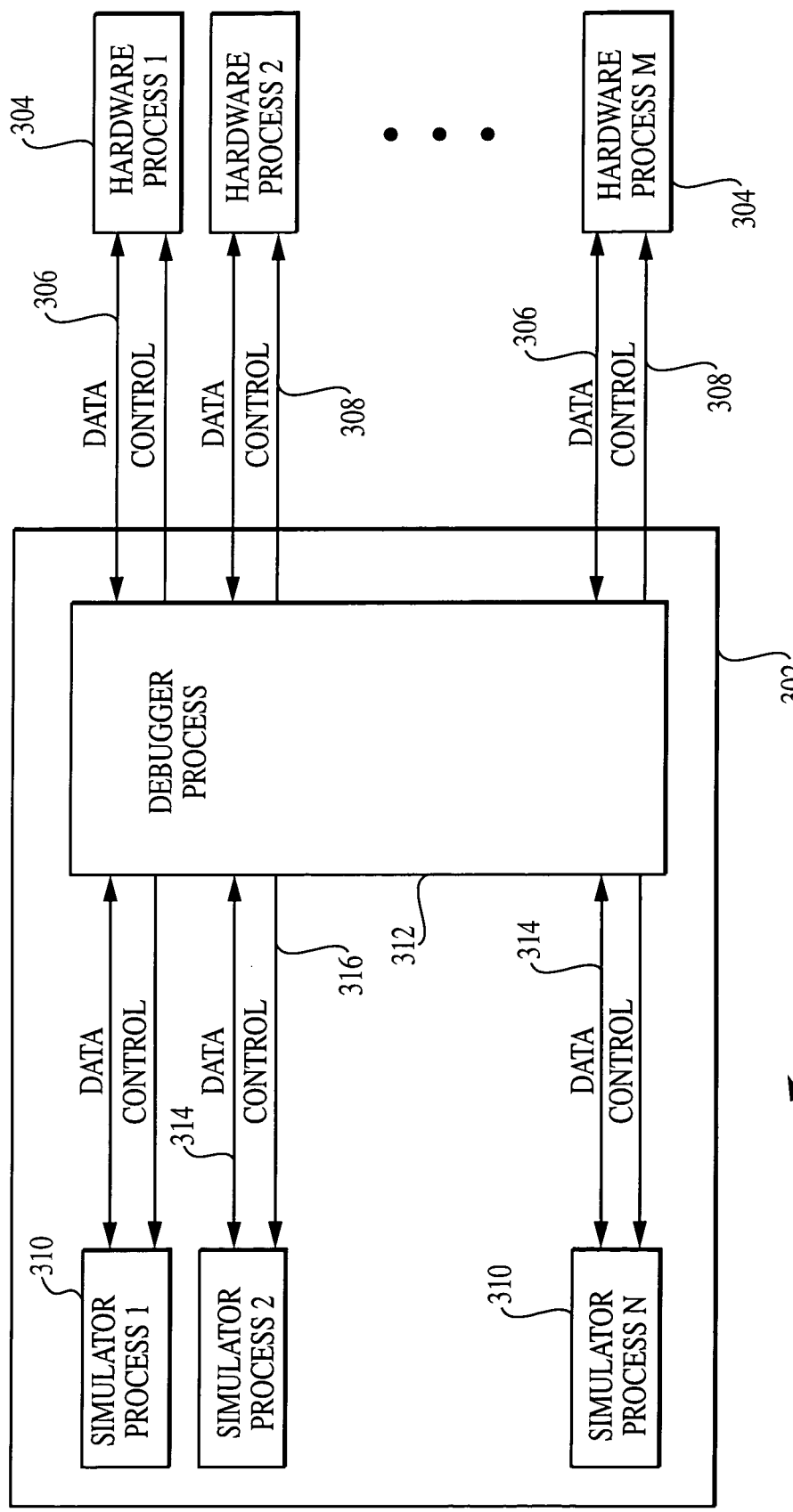
FIG. 3 is a block diagram of an exemplary multi-processor debugging architecture for which the methodology of FIG. 1 may be applied.

Referring now to FIG. 3, one exemplary multiprocessor debugging architecture 300 for which the foregoing method may be used is described. The architecture 300 generally comprises a debugger/simulator process 302, and a plurality of hardware processes 304 each operatively coupled via respective data paths 306 and control paths 308 to the debugger/simulator 302. Note that the control paths 308 are unidirectional, whereas data may flow both to and from the hardware processes 304 via the data paths 306. It will be recognized that, depending on the type of hardware platform employed to implement the debugger/simulator 302 (see FIG. 4 below for one exemplary embodiment), various types of data and control pathway hardware may be employed, such as RS-232, IEEE-1394 "Firewire", or even fiber or wireless links, so long as any required timing relationships are preserved. Alternatively, the debugger/simulator 302, including data and control paths, may be physically integrated with the hardware processes, such as by being disposed entirely within a single silicon substrate. For example, the debugger/simulator may be employed as an algorithm running on a RISC processor, CISC microprocessor, digital signal processor (DSP), or other digital processor associated with the individual hardware processes.

The debugger/simulator 302 of FIG. 3 comprises a plurality of individual simulator processes 310, operatively coupled to a debugger process 312 via additional respective data paths 314 and control paths 316. The debugger and simulator processes 310, 312 in one embodiment comprise software implementing the foregoing methodology, although it can be appreciated that at least portions of the methods of FIGS. 1 and 2 may be embodied in firmware or even hardware if desired.

Each simulator process 310 (1 through N) of FIG. 3 is representative of a single instance of a simulator that functions as the target central processing unit (CPU) of the complete system. Each simulator process 310 may implement any instruction set architecture as is needed by the actual designed heterogeneous multiprocessor system. Simulation processes may be used for a number of reasons including unavailability of hardware, a desire to control systems debug such that hardware transient behaviors are not present, and for reasons of cost. Likewise, each hardware process 304 represents a single instruction set architecture within the heterogeneous multiprocessor system. These processes may be actual physical semiconductor devices, or an in-circuit emulator (ICE) of the type well known in the art. Hardware processes may be used when fast execution is desired, debugging of hardware interfaces is taking place, or the actual operation of the hardware is in some way different that that exhibited by the simulation model.

Each of these processes, either hardware or software, may implement any desired instruction set architecture or a fixed function operation. Examples of an instruction set architecture include but is not limited to: Intel 8080, 8086, 8036, Pentium, Motorola 68000, 68030, PowerPC, Texas Instruments TMX320C6100 and the like. Fixed function operations may include, but it not limited to: special purpose hardware such as Viterbi decode, digital filters, noise shapers, FFT, and the like.

Accordingly, the present invention is advantageously compatible with systems represented by only simulator processes or hardware processes, as well as those that are represented by a combination of simulation and hardware processes. These processes may be homogeneous or heterogeneous in nature, thereby providing the engineer with additional flexibility not present in prior art techniques.

Apparatus for Implementing Methodology

Figure 4:
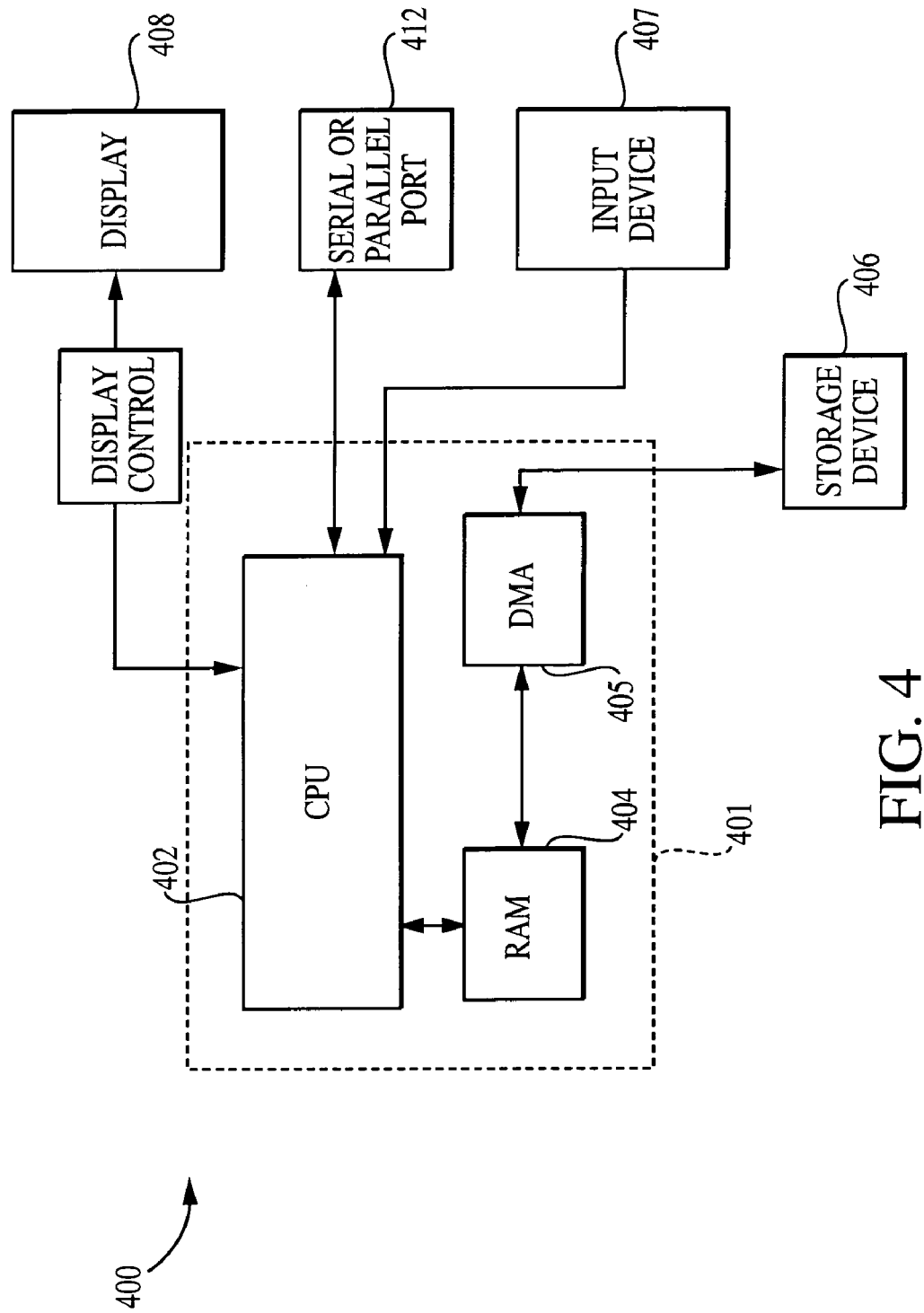
FIG. 4 is a functional block diagram of one exemplary embodiment of a computer system useful for running a computer program embodying the method of FIG. 1.

Referring now to FIG. 4, one embodiment of a computing device capable of implementing the debugging methods (in the form of a computer program) discussed previously herein with respect to FIGS. 1–2*a* is described. It is noted that the foregoing methods are readily reduced to source code listings in any useful higher level programming language, such as for example C$^{++}$, and subsequently compiled, by one of ordinary skill in the computer programming arts. Appendix I hereto provides one such exemplary source code listing.

The computing device 400 comprises a motherboard 401 having a central processing unit (CPU) 402, random access memory (RAM) 404, and memory controller 405. A storage device 406 (such as a hard disk drive or CD-ROM), input device 407 (such as a keyboard or mouse), and display device 408 (such as a CRT, plasma, or TFT display), as well as buses necessary to support the operation of the host and peripheral components, are also provided. The method of FIG. 1 are embodied in the form of an object code representation of a computer program and stored in the RAM 404 and/or storage device 406 for use by the CPU 402 during analysis, the latter being well known in the computing arts. Alternatively, the computer program may reside on a removable storage device (not shown) such as a floppy disk or magnetic data cartridge of the type also well known in the art. The user (not shown) analyzes the data input from the various sources (such as heterogeneous processors) by inputting initiating operation of the computer program via the program displays and the input device 407 during system operation. Alternatively, the system may be configured to automatically accept (and store if desired) the various data inputs and run the computer program when sufficient data exist, or on a periodic or ongoing basis. Many such alternative are possible, each being well within the skill of the ordinary practitioner. Analyses and/or formatted data generated by the program are stored in the storage device 406 for later retrieval, displayed on the graphic display device 408 for viewing by the user, or output to an external device such as a printer, data storage unit, other peripheral component via a serial or parallel port 412 if desired.

It may be appreciated that any number of types of information may be displayed on the graphic display device. The following is illustrative and not prescriptive for such data information. The actual program code executed by the process may be displayed in source code format, assembly language format, or a numerical radix based format where the radix corresponds to a word size or other informative division of data. Execution traces of addresses, address ranges, data values, subroutine entry/exit and the like may also be displayed. For some debug environments interprocessor communications and internal program or processor state information may be displayed. The forgoing information may be displayed in a variety of forms convenient to the user such as bar graphs, histograms, "eye charts", flowcharts, or textual forms.

One preferred embodiment of the hardware used in conjunction with the debugger program previously described herein is based on the industry standard IBM Personal Computer architecture operating on an Intel microprocessor. Such a computer generally comprises a display mechanism such as a CRT display, input devices such as a keyboard and mouse, storage media such as a hard disk drive, communications ports to communicate with any external hardware such as target hardware boards or in-circuit emulators (ICEs). Other alternatives include workstations manufactured by Sun Microsystems of Mountain View California based on the Sun SPARC microprocessor. These workstations employ peripherals such as those listed above for the IBM Personal Computer but operate internally on a different microprocessor, systems bus, and UNIX-based operating system. However, these examples are merely illustrative, and not prescriptive of the type of hardware on which the invention can operate. In addition to the so-called "clone" machines of the above named companies, there are many other alternative personal computers and workstations upon which the invention can operate. These include those manufactured by Hewlett-Packard, Intergraph, Data General, Apple Computer, and others.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

Copyright © 2000–2001 Metaware Software, Inc. All rights reserved.

```
NOINLINE void check_for_completion(
    void each()->(common_RCE*)!,   // Set of command
processors.
    common_RCE *only_this_one,bool &running,
    bool &repeat_check_immediately,
    unsigned *sleep_timep=0) {
if (sleep_timep) *sleep_timep = 0;
// Polling. If all the running processes are non-simulators, should
// sleep in-between polling. Otherwise, can run the simulators
// and check the real machine in between, as long as wait long
// enough so as not to burden the real machine. i.e., the loop is:
//   repeat . . .
//      for each running R do
//         if R is a simulator, check its status.
//         else if R is hardware, if we've waited
//         long enough since last check, check it
//         else early = min(early,R's last check time + min wait)
//         end for
//      if there were no simulators, sleep (current_time-early)
//      end repeat
//
// With the GUI this process will be different. The GUI will issue
// status checks periodically.
```

APPENDIX I-continued

Copyright © 2000–2001 Metaware Software, Inc. All rights reserved.

```
running = FALSE;
repeat_check_immediately = FALSE;
bool ran_a_simulator FALSE, need_sleep = FALSE;
unsigned earliest_we_can_check_hardware = (unsigned)-1;
unsigned now() { return get_system().get_llio().walltime_milli-
seconds();
} bool changed_status = FALSE,
somebody_wants_checking_always = FALSE;
changed_status = FALSE;
somebody_wants_checking_always = FALSE;
for R <- each() do {
  if (only_this_one != 0 && only_this_one != R) continue;
  dbg && printf("check for completion on %s\n",
     R.get_system().get_name());
  if (R.get_process() == 0) continue;
  dbg && printf("checking process [%d]:\n",R.rce_number);
  dbg && (R.display_processes(),0);
  bool was_executing = R.get_process().is_executing();
  void check_status() {
    if (!R.get_system().is_simulator())
      dbg && printf("!!status check on HW [%d] %s\n",
      R.rce_number,
        R.get_system().name());
    R.status(0,FALSE,!was_executing);
  }
  System *R_system = R.get_system();
  0 && printf("system %s wase %d csa %d\n",
    R_system.name(),was_executing,
    R_system.check_status_always);
  if (R_system.check_status_always)
    somebody_wants_checking_always = TRUE;
  if (was_executing || R_system.check_status_always) {
    // Warning: each time you do a status check, process
    // could have terminated, so verify that process is non-zero.
    if (R_system.is_simulator()) {
      check_status();
      ran_a_simulator = was_executing
      // Either was executing or is now executing.
      || R.get_process() && R.get_process().is_executing();
    }
    else {
      unsigned Now = now();
      unsigned POLL_WAIT = R.get_process().get_key().delay.
         get_poll_delay();
      if (FALSE && globals.trace_sleep) {
        printf("[%d]POLL WAIT comes back as %d ",
           R.get_rce_number,POLL_WAIT);
        printf("delta is %d ",Now - R.time_since_last_poll);
        printf("earliest %d\n",earliest_we_can_check_hardware);
      }
      if (Now - R.time_since_last_poll >= POLL_WAIT) {
        // printf("polling [%d]\n",R.get_rce_number());
        check_status();
        Now = now();    // Status might have taken a while.
        R.time_since_last_poll = Now;
        // Now get the next value of delay, which may have
        // gone down (e.g., hostlink) or up. This has
        // the necessary side effect of changing the delay.
        if (R.get_process())
          POLL_WAIT =
     R.get_process().get_key().delay.current_poll_delay();
      }
      else need_sleep = TRUE;
      unsigned earliest = R.time_since_last_poll + POLL_WAIT;
      earliest_we_can_check_hardware = _min(
         earliest_we_can_check_hardware,earliest);
    }
    bool is_executing =
      // The process may have died as a result of checking status.
      R.get_process() && R.get_process().is_executing();
    running = running || is_executing;
    changed_status |= was_executing != is_executing;
  }
  Process *process = R.get_process();
  dbg && process && printf("!pic %d cd %d\n",
    process.is_executing(), R.completion_delayed);
```

APPENDIX I-continued

Copyright © 2000–2001 Metaware Software, Inc. All rights reserved.

```
// The process may have died as a result of checking status.
if (process && !process.is_executing()) {
  if (R.completion_delayed) {
    // Announce status.
      dbg && printf("Call step completion\n");
      R.step_completion(R.completing_stmt_step,TRUE);
  }
  process.get_key() .delay.minimize_poll_delay();
}
//
  repeat_check_immediately = TRUE;
}
if (!ran_a_simulator && need_sleep && running) {
  unsigned Now = now();
  if (Now > earliest_we_can_check_hardware);
  else {
    unsigned sleep_time = earliest_we_can_check_hardware-Now;
    if (sleep_timep) {
      // printf("!not sleeping for %d; let GUI do
it.\n",sleep_time);
      *sleep_timep = sleep_time;
    }
    else {
      get_system().get_llio().sleep(sleep_time);
      // printf("!sleep for %d\n",sleep_time);
    }
  }
}
```

We claim:

1. A method of debugging a plurality of processes on a plurality of heterogeneous processors using a debugger program, comprising:
   initializing a poll delay associated with each process;
   determining the state of said debugger program;
   if said state comprises a first value, determining the run status of at least one of said processes;
   if said at least process is running, determining a process type associated with said at least one process;
   if said process type comprises a simulation type, advancing through at least one instruction cycle and checking the status of said simulated process; and
   if said process type comprises a hardware type, delaying said debugger program for a predetermined time until a subsequent polling opportunity is available, and determining the status of said hardware process at or after said subsequent polling opportunity;
   wherein said plurality of processes are adapted to gather status information regarding respective ones of said heterogeneous processors as controlled by said debug process, said gathering of status information occurring on a dynamic per-process time interval.

2. The method of claim 1, further comprising:
   utilizing said debugger program to check a value of simulator variable to determine whether any currently running ones of said processes are executing in a simulator; and if so, returning said debugger program immediately to said act of determining the state so that said processes executing in a simulator will run as quickly as possible.

3. The method of claim 1, further comprising analyzing said status information to identify at least one or more occurrences of errors.

4. The method of claim 1, further comprising:
   defining at least one object class;
   defining at least one first object subclass for said hardware type process; and
   defining at least one second object subclass for said simulation type process.

5. The method of claim 1, further comprising dynamically changing polling times associated with at least one of said plurality of processes based on the status thereof.

6. The method of claim 1, further comprising defining an interface to a first library for said hardware type process.

7. The method of claim 6, further comprising accessing said first library via said interface in order to provide functions relating to at least one extension instruction.

8. The method of claim 1, further comprising defining an interface to a first library for said simulation type process.

9. The method of claim 8, further comprising accessing said first library via said interface in order to provide functions relating to at least one extension instruction, including the implementation of said at least one extension instruction.

10. The method of claim 1, further comprising:
    defining a plurality of individual subclasses for each of said plurality of processes; and
    implementing at least a portion of said subclasses as a dynamically loadable library.

11. The method of claim 1, wherein said gathering of status information comprises switching without determining whether or not a debug event has occurred.

12. The method of claim 1, wherein said act of gathering status information comprises obtaining said status information without determining whether a debug event has occurred.

13. An apparatus for debugging a plurality of processes on a plurality of heterogeneous processors, said apparatus debugging according to the method comprising:
    initializing a poll delay associated with each process;
    determining the state of said debugger program;
    if said state comprises a first value, determining the run status of at least one of said processes;
    if said at least process is running, determining a process type associated with said at least one process;
    if said process type comprises a simulation type, advancing through at least one instruction cycle and checking the status of said simulated process; and
    if said process type comprises a hardware type, delaying said debugger program for a predetermined time until a subsequent polling opportunity is available, and determining the status of said hardware process at or after said subsequent polling opportunity;
    wherein said plurality of processes are adapted to gather status information regarding respective ones of said heterogeneous processors as controlled by said debug process, said gathering of status information occurring on a dynamic per-process time interval.

14. The apparatus of claim 13, wherein said plurality of heterogeneous processors comprises a digital processor embodied as an integrated circuit, and said debugging method comprises is performed by a computer program adapted to run on said integrated circuit.

15. The apparatus of claim 13, further comprising at least one external port adapted for data communication with respective ones of said hardware type processes.

16. A method of debugging a plurality of processes on a plurality of heterogeneous processors using a debugger program, comprising:
    initializing a poll delay associated with each process;
    determining the state of said debugger program;
    determining the run status of at least one of said processes; and determining a process type associated with said at least one process, wherein if said process type comprises a simulation type, advancing through at least one instruction cycle and checking the status of said simulated process; and wherein if said process type comprises a hardware type, delaying said debugger program for a predetermined time until a subsequent polling opportunity is available, and determining the status of said hardware process at or after said subsequent polling opportunity; and wherein said plurality of processes are adapted to gather status information regarding respective ones of said heterogeneous processors as controlled by said debug process, said gathering of status information occurring on a dynamic per-process time interval.

17. The method of claim 16, further comprising:
utilizing said debugger program to check a value of simulator variable to determine whether any currently running ones of said processes are executing in a simulator; and if so, returning said debugger program immediately to said act of determining the state.

18. The method of claim 16, further comprising analyzing said status information to identify at least one or more occurrences of errors.

19. The method of claim 16, further comprising:
defining at least one object class, defining at least one first object subclass for said hardware type process; and
defining at least one second object subclass for said simulation type process.

20. The method of claim 16, further comprising dynamically changing polling times associated with at least one of said plurality of processes based on the status thereof.

21. The method of claim 16, further comprising defining an interface to a first library for said hardware type process.

22. The method of claim 21, further comprising accessing said first library via said interface in order to provide functions relating to at least one extension instruction.

23. The method of claim 16, further comprising defining an interface to a first library for said simulation type process.

24. The method of claim 23, further comprising accessing said first library via said interface in order to provide functions relating to at least one extension instruction, including the implementation of said at least one extension instruction.

25. The method of claim 16, further comprising:
defining a plurality of individual subclasses for each of said plurality of processes; and
implementing at least a portion of said subclasses as a dynamically loadable library.

26. The method of claim 16, wherein said gathering of status information comprises switching without determining whether or not a debug event has occurred.

27. The method of claim 16, wherein said act of gathering status information comprises obtaining said status information without determining whether a debug event has occurred.

28. A method of debugging a plurality of processes on a plurality of heterogeneous processors using a debugger program, comprising:
a step for initializing a minimum time period between retrievals of said heterogeneous processor status information for display to a user with each process;
a step for determining the state of said debugger program;
a step for determining the run status of at least one of said processes if said state comprises a first value;
a step for determining a process type associated with said at least one process if said at least process is running;
a step for advancing through at least one instruction cycle and checking the status of said simulated process if said process type comprises a simulation type; and
a step for delaying said debugger program for a predetermined time until a subsequent polling opportunity is available if said process type comprises a hardware type; and
a step for determining the status of said hardware process at or after said subsequent polling opportunity;
wherein said plurality of processes are adapted to gather status information regarding respective ones of said heterogeneous processors as controlled by said debug process, said gathering of status information occurring on a dynamic per-process time interval.

* * * * *